United States Patent Office 3,215,318
Patented Nov. 2, 1965

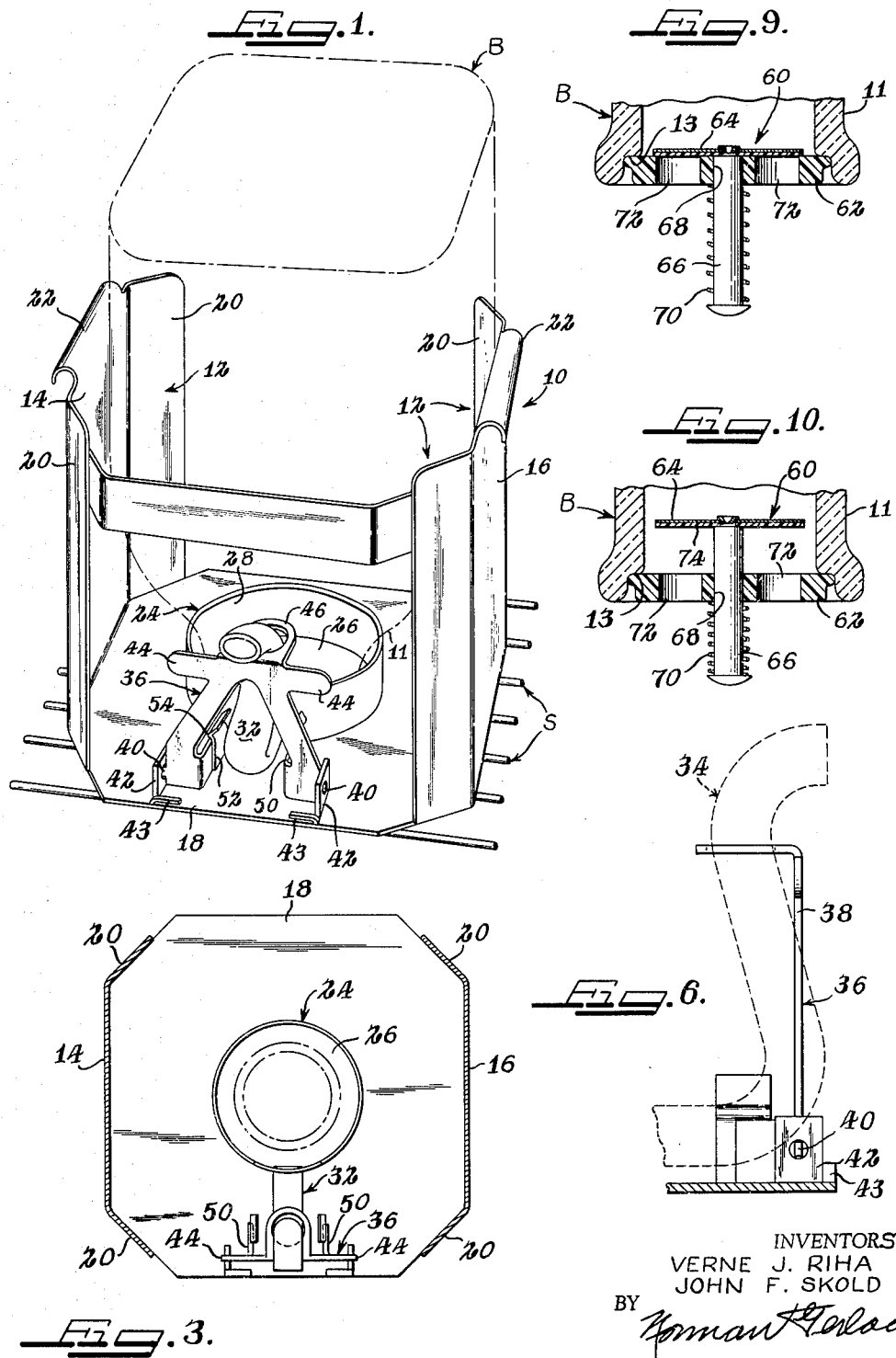

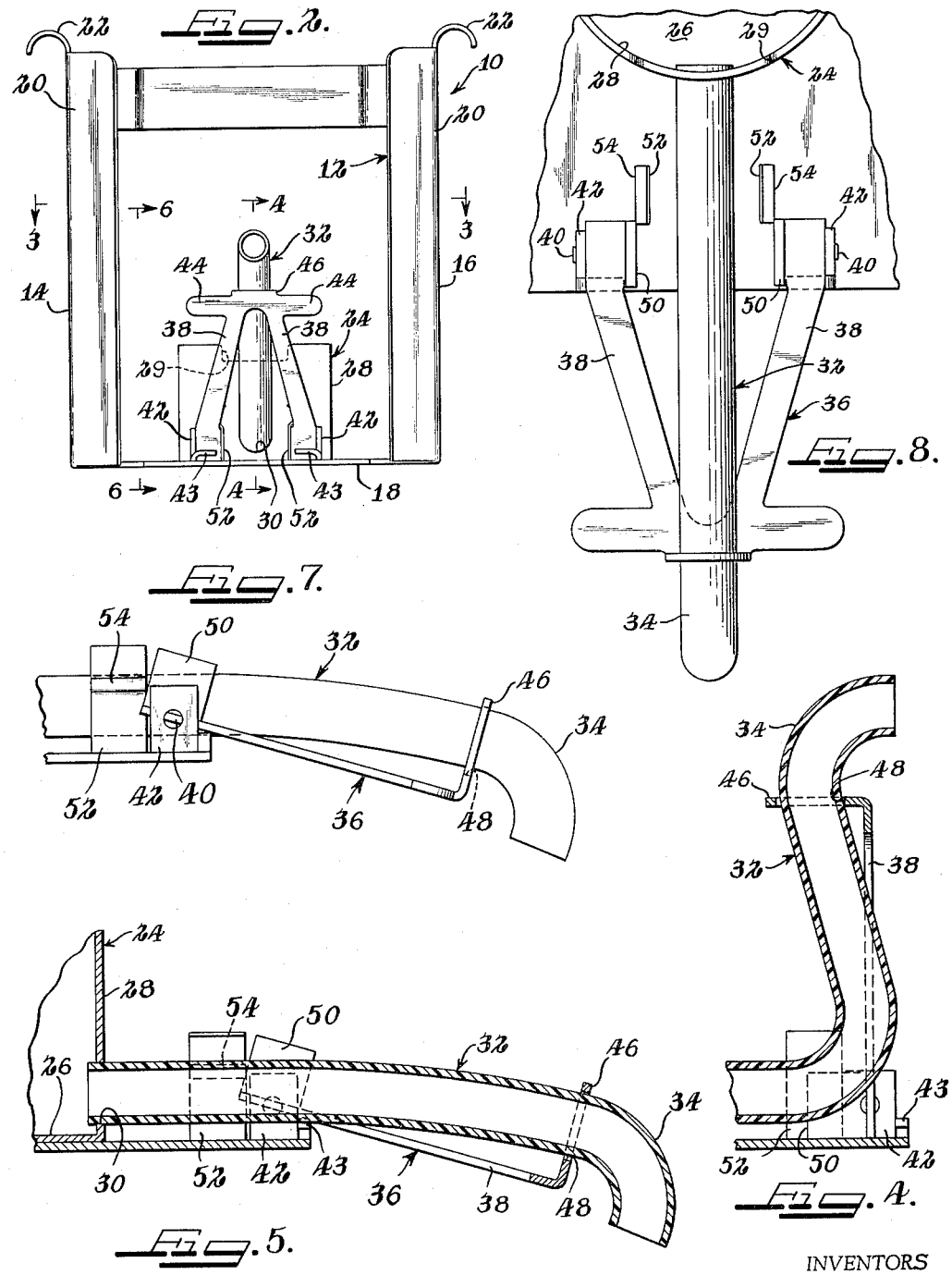

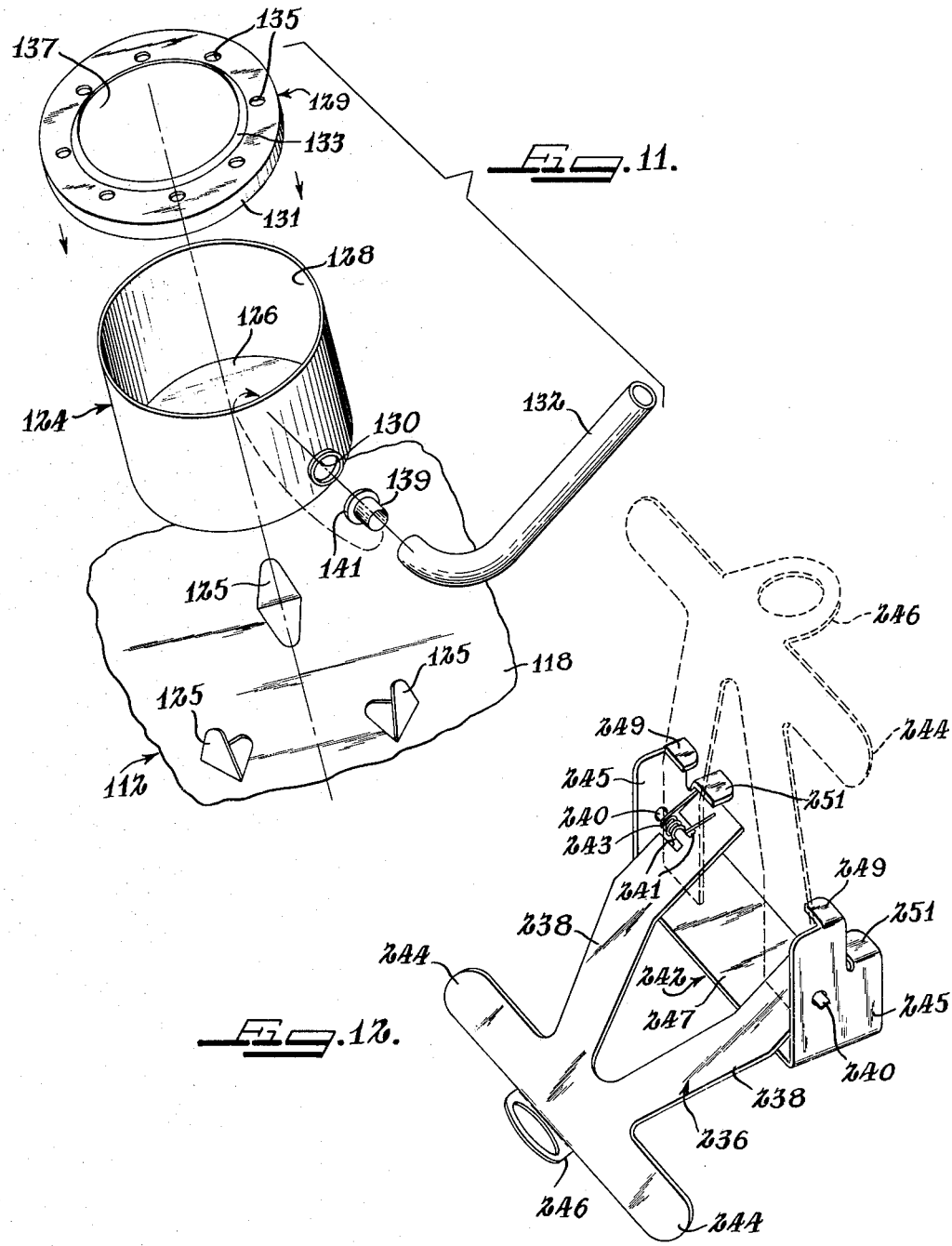

3,215,318
LIQUID DISPENSING APPARATUS
Verne J. Riha, 166 Hirsch St., Northlake, Ill., and John F. Skold, 4650 N. Oak Park Ave., Harwood Heights, Ill.
Filed May 17, 1963, Ser. No. 281,310
9 Claims. (Cl. 222—183)

The present invention relates to liquid dispensing apparatus and has particular reference to that type of liquid dispensing apparatus which is shown and described in our co-pending United States patent application Ser. No. 178,475, filed on Mar. 8, 1962, and now abandoned and entitled Liquid Dispensing Apparatus, the present patent application being a continuation-in-part of said co-pending application.

The improved liquid dispensing apparatus comprising the present invention has been designed primarily for use as a household milk dispenser whereby small quantities of milk may periodically be withdrawn from a large container, for example, a gallon bottle or so-called gallon "jug," this being the type of container currently in use in retail stores where milk is sold by the gallon.

Despite the economy which is involved in purchasing milk in gallon lots, many housewives are discouraged from purchasing milk in such quantity due to the difficulty in handling the glass gallon containers, especially by children. To pour a single glass of milk from a gallon bottle weighing approximately nine pounds is an operation that taxes the strength and ability of most children, especially when the bottle is stored in a refrigerator and requires transportation to a remote location and back to the refrigerator after the glass is filled. If there is moisture of condensation on the bottle, there is the added danger of slippage and possible breakage of the bottle. If the contents of the bottle are divided and placed in smaller containers, for example, two half-gallon bottles or pitchers, in the interests of easier and safer handling during pouring operations, there is a problem of storage area on the refrigerator shelf, as well as of storage for the emptied gallon bottle. There also is the inconvenience of making the initial transfer and of subsequently washing of all bottles or containers involved. Finally, the repeated uncapping and capping of the container for the individual pouring operations is a source of further inconvenience.

The present invention obviates all of these difficulties and provides a novel and convenient dispensing apparatus for the milk or other contents of a gallon bottle or "jug," the apparatus serving to hold the bottle in a dispensing position and having associated therewith a valveless off-on dispensing spout movable between an advanced position wherein milk is caused to flow instantly from the spout, and a retracted position where the flow of milk is immediately discontinued. The invention further contemplates a dispensing apparatus of this type wherein there is provided a bottle-retaining cradle or holder into which a conventional store bottle may conveniently be slipped with the bottle in an inverted position. When in position within the cradle, the reduced neck portion of the bottle extends downwardly into an open hydrostatic submersion pool, and since the atmospheric pressure acting upon the surface of this pool will support a column of milk approximately 35 feet high, the column of milk contained within the relatively short container will be supported in its entirety and maintained within the container. Means are provided for drawing at will small quantities of milk from the hydrostatic submersion pool, and at such time as the level of the surface of the pool falls below the level of the rim of the inverted bottle neck, milk will flow from the bottle to replenish the milk withdrawn from the pool, thus restoring the level of milk in the pool until it rises to the level of the rim of the bottle neck, whereupon atmospheric pressure again supports the column of milk within the bottle.

The provision of a dispensing apparatus of the character briefly outlined above being among the general objects of the invention, it is a further object to provide such an apparatus which does not materially increase the effective height of the container operatively positioned therein so that a spacing arrangement of shelving in a refrigerator which is designed to receive a gallon milk bottle may also receive the dispensing apparatus with the bottle operatively mounted therein whereby dispensing operations may take place by manipulations through the door opening of the refrigerator without requiring requiring removal of the bottle from its shelved position within the refrigerator compartment. A similar and related object of the invention is to provide such an apparatus which when in position on a refrigerator shelf occupies substatnially no greater shelf space than does the bottle alone.

A still further general object of the invention is to provide a dispensing apparatus in which the bottle-receiving cradle thereon will, without alteration or adjustment, accommodate reception of either the conventional square-type of gallon bottle or jug, or the conventional round-type of container so that the user thereof is not limited to the purchase of either type. A similar and related general object is to provide an apparatus in which the hydrostatic submersion pool that is associated therewith will accommodate successive projection thereinto of milk bottles having either the conventional 2¼ inch or the conventional 2¾ inch over-all neck diameter without requiring alteration or adjustment of the apparatus.

A specific object of the invention is to provide a dispensing apparatus in which the constituent parts, particularly those which are likely to come into contact with liquid are capable of being easily disassembled so that they may be cleaned from time to time when required and in which the dispensing spout, when removed, presents a passage which is susceptible to reception therethrough of a conventional spout-cleaning brush of the flexible coffee or teapot cleaning variety so that the interior of the spout may be readily cleaned.

It is a still further object of the invention to provide, in a liquid dispensing apparatus of the type under consideration, a novel dispensing spout actuating frame, together with a novel bracket support for such frame, the frame and bracket support having associated therewith cooperating interengaging limit stop elements whereby the movements of the frame are limited in two extreme positions, namely, a position of full liquid flow through the dispensing spout and complete spout cut-off.

Another object of the invention is to provide novel means for pivoting the spout-actuating frame on its bracket support and for yieldingly biasing the frame toward its position of complete spout cut-off.

The provision of a liquid dispensing apparatus which is extremely simple in its construction and, therefore, requires a minimum of effort on the part of an adult or a child for the installation of a full gallon bottle or jug therein or for the removal of an empty jug therefrom; one which is comprised of a minimum number of moving parts and, therefor, it is unlikely to get out of order; one in which the principal parts thereof may be formed of sheet metal construction thereby contributing toward economy of manufacture; on which is rugged and durable and, therefore, will withstand rough usage; and one which is attractive in its appearance and pleasing in its design, are further desirable features which have been borne in mind in the production and development of the present invention.

Other objects and advantages of the invention not at this time enumerated will become readily apparent as the following description ensues.

In the accompanying three sheets of drawings forming a part of this specification, two illustrative embodiments of the invention have been shown.

In these drawings:

FIG. 1 is a perspective view of one embodiment of a milk dispensing apparatus constructed in accordance with the principles of the present invention and showing the same in position on a refrigerator shelf;

FIG. 2 is a front elevational view of the apparatus shown in FIG. 1;

FIG. 3 is a sectional view taken on the line 3—3 of FIG. 2;

FIG. 4 is an enlarged sectional view taken on the line 4—4 of FIG. 2;

FIG. 5 is a sectional view similar to FIG. 4 but showing the dispensing spout in its extended operative pouring position;

FIG. 6 is an enlarged sectional view taken on the line 6—6 of FIG. 2 and having the flexible dispensing spout shown by dotted lines in the interest of clarity;

FIG. 7 is a sectional view similar to FIG. 6 but showing the dispensing spout in its extended operative pouring position;

FIG. 8 is a top plan view of the structure shown in FIG. 7;

FIG. 9 is an enlarged fragmentary sectional view taken substantially centrally and vertically through the neck portion of a milk bottle in which there is installed a wafer valve employed in connection with the invention, the valve being shown in its closed position;

FIG. 10 is a sectional view similar to FIG. 9 but showing the valve in its open position;

FIG. 11 is a fragmentary exploded perspective view showing an alternative cup assembly capable of being employed in connection with the invention; and FIG. 12 is a fragmentary perspective view of an alternative spout-acuating frame and bracket assembly capable of use in connection with the invention.

Referring now to the drawings in detail and in particular to FIG. 1, a dispensing apparatus constructed according to the present invention has been designated in its entirety by the reference numeral 10. It is shown as having operatively disposed therein a container, such as a milk bottle B, the latter being shown in dotted lines in this view. Although the dispensing apparatus 10 may be employed for dispensing a wide variety of liquid substances contained in containers which vary as to size, shape, and capacity, the container which is illustrated herein is in the form of a conventional glass milk bottle or jug which when filled is capable of holding one gallon of milk.

Conventional gallon milk bottles currently in use in retail stores possess the same general shape characteristics and do not deviate among themselves appreciably. The bottles of different manufacturers are all about the same height but some of them are circular in cross section, while others are generally square. Practically all gallon milk bottles have neck portions which are circular in cross section, regardless of the shape of the body portions thereof, and the circular rims are recessed to receive therein by a pressed fit the usual paperboard closure disk or cap. Lifting bails of one type or another, usually either metal or plastic, are invariably provided and such bails have attachment bands which encircle the neck portions of the bottles. With few exceptions, if any, commercial gallon milk bottles are provided with neck portions having a diameter of either 2¼ or 2¾ inches over-all measurement. The dispensing apparatus 10 is designed to accommodate all such commercial gallon milk bottles and it will also accommodate narrow neck gallon jugs of glass, such as are employed in the sale of apple cider. The bottle B, whether of the square or round type, is provided with a reduced neck portion 11 which may be either of the 2¼ inch over-all diameter type or of the 2¾ inch over-all diameter type. The neck portion 11 of the bottle B is recessed as at 13 (see FIGS. 9 and 10) for reception of the usual paperboard disk currently employed for sealing a milk bottle.

Still referring to FIG. 1, the dispensing apparatus 10 involves in its general organization a generally U-shaped unitary one-piece retaining cradle 12 which is formed of sheet metal and includes a pair of vertically disposed side walls 14 ad 16 and an interconnecting flat base 18. The front and rear side margins of the side walls 14 and 16 are turned inwardly at an obtuse angle to the general planes of these side walls to provide inclined flanges 20 which overlie the base 18 and provide surfaces which mate with the truncated corner regions of a conventional square-type gallon milk bottle so that such a bottle may be inserted endwise vertically and in inverted relationship into the cradle as shown in dotted lines in FIG. 1. The cradle also may receive therein a conventional round-type gallon milk bottle in inverted relationship, and when so received, the two side walls 14 and 16 and also the in-turned portions or flanges 20 make tangential contact with the body portion of the bottle.

The upper edges of the side walls 14 and 16 are rolled outwardly as at 22 to provide lifting or carrying handles whereby the apparatus 10 as a whole may be manually transported in either its loaded or its unloaded condition.

Centered on the upper face of the octagonal base 18 is an open upwardly facing cup-shaped member 24 (see FIGS. 1, 9 and 10) having a bottom wall 26 suitably secured to the base 18, and a cylindrical side wall 28 having an open upper rim. The wall diameter of the member 24 is greater than the over-all diameter of the reduced neck portion of the bottle so that when the bottle is inverted, the neck portion thereof may extend into the open rim of the cup-shaped member 24 and clear the cylindrical side wall 28 thereof. As will be made clear presently, the cup-shaped member 24 is designed to establish an hydrostatic submersion pool of the milk contained within the bottle B. The rim of the cup-shaped member 24 may be provided with one or more cut-away portions, such as the one shown at 29 (see FIGS. 2 and 8), to accommodate the offset glass handle which sometimes is provided on a jug, such as a cider jug, in the event that the dispensing apparatus is employed in connection with such a jug.

Adjacent to the bottom of the cup-shaped member 24 and in the forward region thereof, there is provided an outlet opening 30 (see FIGS. 1 and 5) and within this opening there is secured the proximate end of a flexible dispensing spout 32. The dispensing spout 32 is in the form of a length of flexible tubing of elastomeric material, such as rubber, or it may be formed of a plastic material, as, for example, one of the synthetic resins. The distal end region of the dispensing spout 32 is curved as shown at 34 and this region is carried in a pivoted actuating frame 36. The latter is generally of V-shape configuration and may, if desired, be in the form of a sheet metal stamping. The frame 36 includes a pair of downwardly diverging legs 38, the free ends of which are formed with trunnion ears 40 which project through openings in respective brackets 42 which project upwardly from the base 18 a short distance at spaced regions thereon. The frame is thus pivoted for swinging movement about a horizontal axis between the vertical elevated position wherein it is shown in FIG. 4 and the horizontal lowered position wherein it is shown in FIG. 5. The lowered position of the frame 36 is determined by means of a pair of limit stop fingers 43 (see FIGS. 1 and 2) which are bent inwardly toward each other from the two brackets 42 respectively.

The connected ends of the diverging legs 38 merge into a broad flat region which presents a pair of oppositely extending manipulating ears 44 and a laterally turned collar portion 46 having an opening 48 therethrough. The curved region 34 of the dispensing spout projects through the opening 48 in the laterally turned collar portion 46 with a fairly snug fit so that as the frame 36 is swung between its raised and lowered positions, the outer portions of the flexible spout 32 will move bodily therewith, while the proximate end region of the spout will remain substantially fixed since it is operatively connected to the cup-shaped member 24.

Means are provided for frictionally latching the frame 36 in its raised position and for limiting the lowered position thereof. Accordingly, at the pivoted end of the frame 36, the arms 38 are provided with laterally turned friction dogs 50 (see FIGS. 6, 7 and 8) which bear against the outer sides of a pair of spaced upstanding spring fingers 52 on the base 18. Each finger is in the form of a strip of flat sheet metal which is bent to obtuse angle form so as to present a sharp rib 54 therealong. The dogs 50 are generally square as shown in FIG. 7, and when the frame 36 is in its raised position, the dogs 50 latch in position immediately below the ribs 54 as shown in FIG. 6. When the frame 36 is in its lowered position, the dogs 50 latch in front of the ribs 54 as shown in FIG. 7. The ribs 54 extend at a slight angle to the general plane of the friction dogs 50 so that in any intermediate position of the frame 36, the latter will remain self-supporting to hold the spout 32 in selected adjusted positions.

Referring now to FIGS. 9 and 10, in order to retain the contents of the bottle B against spilling during inverting of the bottle preparatory to insertion of the neck portion thereof into the open rim of the cup-shaped member 24, a self-closing closure valve assembly 60 is adapted to replace the usual paperboard disk which is currently employed for sealing the rim of a gallon milk bottle. The valve assembly 60 is of conventional design and similar assemblies are currently in use in connection with hydrostatic submersion pools of liquid which are established by reason of inverted liquid-filled containers, for example, kerosene containers which are employed in connection with wick-type stoves. The valve assembly involves in its general organization a fixed disk 62 and a movable disk 64, the fixed disk being designed for reception in the recess 13 of the bottle neck 12. The movable disk 64 is carried at the upper end of a plunger stem 66 which extends slidably through a guideway 68 in the fixed disk 62 and is normally urged toward the latter disk by means of a helical compression spring 70 which surrounds the plunger stem. The fixed disk is formed with a series of relatively large diameter outlet ports 72 which are closed by a sealing liner 74 on the disk 64 when the latter effectively seats on the disk 62 but which are uncovered when the lower end of the plunger stem 66 engages the bottom wall 26 of the cup-shaped member 24 and forces the disk 64 away from the disk 62 as shown in FIG. 10.

In the operation of the dispensing apparatus 10, a full gallon bottle, such as the bottle B, is initially conditioned for use in the apparatus by substitution of the valve assembly 60 for the conventional paperboard sealing disk, after which the bottle and its contents are inverted and the neck portion 13 of the bottle is inserted into the open rim of the cup-shaped member 24 so that the side walls 14 and 16 of the cradle 12 embrace the opposite sides of the body portion of the bottle. Upon manual release of the bottle, the lower end of the plunger stem 66 is supported upon the bottom wall 26 of the cup-shaped member 24 and the entire weight of the bottle and its contents is applied to the spring 70 which goes solid so that the perforated fixed disk 62 and the imperforate movable disk 64 become separated, thus uncovering the outlet ports 72. Milk within the bottle B then flows through the ports 72 and enters the cup-shaped member 24 to establish an hydrostatic submersion pool of milk therein. At such time as the level of milk in the pool rises to substantially the level of the open rim of the inverted bottle neck 13, the contents of the bottle and of the hydrostatic pool function in the manner of a sealed tube liquid barometer wherein the atmospheric pressure acting on the surface of the hydrostatic submersion pool acts on the milk in the bottle to support the same and prevent further egress of milk from the bottle.

With the frame 36 in its raised position, the upper end of the flexible spout 32 is raised above the level of milk in the pool so that the proximate region of the spout, in effect, constitutes a trap which prevents flow of the milk through the spout, while at the same time, sealing the contents of the bottle from the ambient atmosphere.

When it is desired to dispense the contents of the bottle B, or any portion thereof, it is merely necessary manually to move the pivoted frame 36 toward its lowered position utilizing the ears 44 for gripping purposes. At such time as the distal end of the spout 32 moves below the level of milk in the hydrostatic pool, i.e., below the level of the rim of the inverted bottle neck 13, milk will commence to flow through the spout under the influence of gravity. Since the hydrostatic pool of milk is open to the atmosphere, the annulus surrounding the bottle neck being exposed, this flow of milk through the spout 32 is unrestrained and the rate of flow of the milk through the spout may be controlled by varying the elevation of the distal end of the spout. When the frame 36 is in its fully lowered horizontal position, maximum milk flow through the spout will be attained.

It is to be noted that the overall height of the bottle B is not materially increased so that a refrigerator shelf spacing which is only a fraction of an inch greater than the height of the bottle alone will suffice to permit the dispensing apparatus and its contained bottle to be positioned on a refrigerator shelf. With the apparatus so disposed on a refrigerator shelf, or on the edge region of a table or other support, ample room is afforded for positioning of a glass or other container beneath the spout for filling purposes.

After the desired quantity of milk has been thus dispensed, it is merely necessary manually to move the frame 36 to its fully elevated position so that the hydrostatic pool of milk will again become effective to seal the remaining contents of the bottle and prevent egress of the same.

In FIG. 11 there has been illustrated a composite cup assembly for establishing the hydrostatic submersion pool of liquid beneath the inverted bottle B, this assembly when employed instead of the cup-shaped member 24, facilitating an easier emptying of residual liquid from the submersion pool and cleaning of all of the individual parts of the dispensing assembly than is possible with the apparatus that is shown in FIGS. 1 to 10, inclusive.

Apart from the cup assembly which establishes the hydrostatic submersion pool and a slight modification which has been effected in the flat base of the bottle-retaining cradle so that the cup assembly may be removed therefrom, the details of the dispensing apparatus have not been altered. Thus, to avoid needless repetition of description, similar characters of reference have been applied to corresponding parts wherever possible as between the disclosures of FIGS. 1 and 11.

The composite cup assembly of FIG. 11 includes a cup proper 124 which is similar to the cup-shaped member 24. The cup 124, however, instead of being fixedly secured to the flat base 118 of the bottle-retaining cradle, is detachable therefrom. The cup 124 is held in its centered position on the base 124 by means of three friction ears 125 which are struck up from the base and thus, in effect, provide a friction cradle for the base region of the cup. With the cup 124 removed from the base 118, the entire area of the base is accessible for sponging or otherwise cleaning thereof, while at the same time, the absence of the cup gives access to the side walls of the cradle for cleaning purposes. The cup 124 is installed on, and removed from, the base 118 simply by pushing it into place or pulling it vertically from the base.

The cup 124 is provided with a removable rim member 129 which is of annular design, has a cylindrical flange 131 encompassing the rim of the cup 124, and also has an in-turned circular flange 133 which is of short radial width and is provided with a series of small vent openings 135. The rim member 129 fits frictionally over the rim of the cup 124 in telescopic fashion and is formed with a large central opening 137 for reception of the neck portion of the bottle B. The openings 135 are provided for the purpose of bleding the hydrostatic submersion pool to the atmosphere to prevent pressure build-up when the spout 132 is in its liquid cut-off position, and also for the purpose of preventing sub-atmospheric restraint of liquid flow when the spout is passing liquid.

The flexible spout 132 has its proximate end removably secured in the opening 130 by means of an internal expansion nipple 139 which is forced into the proximate end of the spout 132, after which the distal end of the spout is threaded through the opening 130 from the inside of the cup 124 and pulled outwardly until the nipple 139 enters the opening and forces the resilient material of the spout outwardly against the rim of the opening. A flange 141 on the nipple 139 limits the terminal position of the spout when so pulled through the opening.

From the above description, it will be seen that the cup 124, the rim member 129, the nipple 139, and the spout 132 are completely separable from one another and are also separable from the cradle for individual cleaning operations. The procedure involved in their separation and replacement is of a simple nature.

In FIG. 12 there has been disclosed a modified form of actuating frame 236 and supporting bracket 242 therefor, this frame and bracket being capable of use with either the bottle-retaining cradle 12 of FIG. 1 or the cradle 112 of FIG. 11. The frame 236 and the bracket 242 are similar to the frame 36 and cradle 12 of the previously-described form of the invention and, therefore, again, to avoid needless repetition of description, similar reference numerals of a still higher order are employed to designate the corresponding parts.

The actuating frame 236 has a shape similar to the shape of the frame 36 with the exception that the dogs 50 are omitted. Additionally, the trunnion ears 240 are provided with clearance notches 241 on opposite sides thereof and a spring 243 surrounds each trunnion ear and bears at one end against flat portion of the frame and at the other end against a portion of the bracket 242.

The bracket 242 is of U-shape configuration and includes upstanding sides 245 and a connecting base 247. Each side is formed with an upper inturned ear 249 which is designed for engagement with a portion of the frame 236 to limit its upward movement as shown in dotted lines in FIG. 12. A similar inturned ear 251 is provided in the medial region of each side 245 and is engageable with an end of the frame 236 to limit its downward movement as shown in full lines in this view. The upper inturned ear 249 serves the dual function of providing a limit stop for the frame 236 and of providing a reaction member for an end of the spring 243. The two springs 243 serve yieldingly to bias the actuating frame 236 toward its upper position.

In the operation of the dispensing apparatus when equipped with the frame and bracket assembly of FIG. 12, when the frame is in its substantially vertical dotted-line position, the upper end of the spout 232 is above the level of liquid in the hydrostatic submersion pool so that no liquid will issue from the spout. The inclination of the actuating frame 236 will control the rate of liquid discharge through the spout, full liquid flow being attained when the frame 236 is in the lowered full-line position.

The invention is not to be limited to the exact arrangement of parts shown in the accompanying drawings or described in this specification as various changes in the details of construction may be restored to without departing from the spirit of the invention. For example, while the cradle 14 and certain other parts of the apparatus, such as the pivoted frame 36, brackets 42, and other structural parts of the apparatus, have been shown and described herein as being formed of sheet metal, it is contemplated that these parts may be die cast or formed of a suitable plastic material by injection molding or other operations. Therefore, only insofar as the invention has particularly been pointed out in the accompanying claims is the same to be limited.

Having thus described the invention what we claim as new and desire to secure by Letters Patent is:

1. In a liquid dispensing apparatus of the character described for supporting a container having a reduced neck portion, the rim of which constitutes a pouring opening, in an inverted position and for dispensing the liquid contents of the container, in combination, a cradle for receiving the inverted container, means on said cradle establishing an hydrostatic submersion pool into which the neck portion of the container is adapted to extend, a flexible tubular dispensing spout having a fixed proximate end in communication with said submersion pool adjacent to the lower regions thereof and having a movable distal end capable of being moved between a raised position wherein it is disposed above the level of liquid in said submersion pool and a lowered position wherein it is disposed below said level, a frame-like actuating member including a pair of diverging legs the outer ends of which are formed with trunnion ears thereon, supporting brackets on said cradle and into which the trunnion ears project for pivotally supporting the actuating member from the cradle, a laterally extending collar carried at the inner ends of said diverging legs and through which the distal end region of the tubular dispensing spout extends and in which it is supported, said frame-like member being movable between a substantially horizontal position wherein the distal end of the dispensing spout is disposed in its lowered positition, and a substantially vertical position wherein said distal end of the dispensing spout is disposed in its raised position.

2. In a liquid dispensing apparatus of the character described for supporting a container having a reduced neck portion, the rim of which constitutes a pouring opening, in an inverted position and for dispensing the liquid contents of the container, in combination, a cradle for receiving the inverted container, means on said cradle establishing an hydrostatic submersion pool into which the neck portion of the container is adapted to extend, a flexible tubular dispensing spout having a fixed proximate end in communication with said submersion pool adjacent to the lower regions thereof and having a movable distal end capable of being moved between a raised position wherein it is disposed above the level of liquid in said submersion pool and a lowered position wherein it is disposed below said level, a substanially flat frame-like actuating member of generally T-shape design including a bifurcated leg portion having trunnion ears adjacent to one end thereof and a transverse cross portion at the other end thereof, supporting brackets on said cradle and into which said trunnion ears project for pivotally supporting said actuating member from the cradle, a laterally extending collar formed on said cross portion medially thereof and through which the distal end region of the flexible dispensing spout extends and in which it is supported, said frame-like member being movable between a substantially horizontal position wherein the distal end of the dispensing spout is disposed in its lowered position and a substantially vertical position wherein said distal end of the dispensing spout is disposed in its raised position, said cross portion of the generally T-shape frame-like actuating member providing lateral manipulating handles for the actuating member.

3. A liquid dispensing apparatus as set forth in claim 1 and including, additionally, means for yieldingly retaining the actuating member in its vertical position.

4. In a liquid dispensing apparatus of the character described and for supporting a container having a reduced neck portion, the rim of which constitutes a pouring opening, in an inverted position and for dispensing the liquid contents of the container, a cradle for receiving the inverted container, means on said cradle establishing an hydrostatic submersion pool into which the neck portion of the container is adapted to extend, a flexible tubular dispensing spout having a fixed proximate end in communication with said submersion pool adjacent to the lower regions thereof and having a movable distal end capable of being moved between and elevated position wherein it is disposed above the level of liquid in said submersion pool and a lowered position wherein it is disposed below said level, an actuating member for moving the distal end of said spout between its raised and its lowered positions, said actuating member having a proximate end pivoted to the cradle and a distal end operatively connected to the distal end of the spout for movement in unison therewith, means for releasably latching said actuating member in a position wherein the distal end of the spout is in its elevated position, means for releasably latching said actuating member in a position wherein the distal end of the spout is in its lowered position, and means for frictionally restraining said actuating member in any intermediate adjusted position thereof.

5. In a liquid dispensing apparatus of the character described for supporting a container having a reduced neck portion, the rim of which constitutes a pouring opening, in an inverted position and for dispensing the liquid contents of the container, in combination, a cradle for receiving the inverted container, means on said cradle establishing an hydrostatic submersion pool into which the neck portion of the container is adapted to extend, a flexible tubular dispensing spout having a fixed proximate end in communication with said submersion pool adjacent to the lower regions thereof and having a movable distal end capable of being moved between an elevated position wherein it is disposed above the level of liquid in said submersion pool and a lowered position wherein it is disposed below said level, a frame-like actuating member including a pair of diverging legs the outer ends of which are formed with trunnion ears thereon, supporting brackets on said cradle and into which the trunnion ears project for pivotally supporting the actuating member from the cradle, a collar carried at the inner ends of said diverging legs and through which the distal end region of the tubular dispensing spout extends and in which it is supported, laterally turned friction dogs on the outer ends of said legs, and a pair of spring fingers on the cradle and positioned in the path of movement of the friction dogs for restraining the actuating member in any adjusted position thereof.

6. In a liquid dispensing apparatus, the combination set forth in claim 5 and including, additionally, a latching rib on each of said spring fingers and designed for latching cooperation with the friction dogs for maintaining the actuating member in its elevated position against accidental dislodgment.

7. In a liquid dispensing apparatus of the character described for supporting a container having a reduced neck portion, the rim of which constitutes a pouring opening, in an inverted position and for dispensing the liquid contents of the container, in combination, a cradle for receiving the inverted container, means on said cradle establishing an hydrostatic submersion pool into which the neck portion of the container is adapted to extend, a flexible tubular dispensing spout having a fixed proximate end in communication with said submersion pool adjacent to the lower regions thereof and having a movable distal end capable of being moved between a raised position wherein it is disposed above the level of liquid in said submersion pool and a lowered position wherein it is disposed below said level, a frame-like actuating member including a pair of diverging legs the outer ends of which are formed with trunnion ears thereon, supporting brackets on said cradle and into which the trunnion ears project for pivotally supporting the actuating member on the cradle, a collar carried at the inner ends of said diverging legs and through which the distal end region of the tubular dispensing spout extends and in which it is supported, a pair of laterally projecting and oppositely directed manipulating handles on said actuating member in the vicinity of said collar, and spring means yieldingly biasing said actuating member toward a position wherein the distal end of the spout is in its raised position.

8. A liquid dispensing apparatus as set forth in claim 7 and wherein said spring means comprises a torsion spring surrounding each of said trunnion ears, having one end thereof bearing against an adjacent portion of the actuating member and having its other end bearing against the adjacent supporting bracket.

9. In a liquid dispensing apparatus of the character described for supporting a container having a reduced neck portion, the rim of which constitutes a pouring opening, in an inverted position and for dispensing the liquid contents of the container, in combination, a cradle for receiving the inverted container, means on said cradle establishing an hydrostatic submersion pool into which the neck portion of the container is adapted to extend, a flexible tubular dispensing spout having a fixed proximate end in communication with said submersion pool adjacent to the lower regions thereof and having a movable distal end capable of being moved between a raised position wherein it is disposed above the level of liquid in said submersion pool and a lowered position wherein it is disposed below said level, a frame-like actuating member in the form of a substantially flat sheet metal stamping presenting a pair of diverging legs the outer ends of which are formed with trunnion ears thereon, supporting brackets on said cradle and provided with holes into which the trunnion ears project, thus pivotally supporting the actuating member from the cradle, the inner ends of said diverging legs having inturned portions providing manipulating handles for the actuating member, a portion of said sheet metal stamping being turned laterally from the plane of the stamping and providing a collar through which the distal end region of the tubular dispensing spout projects and in which it is supported, a torsion spring surrounding each of said trunnion ears, having one end thereof bearing against an adjacent portion of the actuating member and having its other end bearing against the adjacent supporting bracket.

References Cited by the Examiner
UNITED STATES PATENTS

| | | | |
|---|---|---|---|
| 922,453 | 5/09 | Burgner | 222—181 |
| 1,763,551 | 6/30 | Brown | 222—457 X |
| 1,890,461 | 12/32 | Hamburg | 222—536 X |
| 2,786,606 | 3/57 | Dushek et al. | 222—530 X |
| 2,949,212 | 8/60 | Watson | 222—457 X |

RAPHAEL M. LUPO, *Primary Examiner.*

HADD S. LANE, *Examiner.*